United States Patent [19]
Melone

[11] 3,893,339
[45] July 8, 1975

[54] LIQUID LEVEL INDICATOR

[75] Inventor: Robert Richard Melone, Des Plaines, Ill.

[73] Assignee: Illinois Tool Works Inc., Chicago, Ill.

[22] Filed: Mar. 18, 1974

[21] Appl. No.: 452,086

[52] U.S. Cl. ............... 73/327; 116/118 R; 136/182
[51] Int. Cl. ........................................... G01f 23/02
[58] Field of Search ................. 73/327; 116/118 R; 136/182

[56] References Cited
UNITED STATES PATENTS

| | | | |
|---|---|---|---|
| 3,362,224 | 1/1968 | Melone | 73/327 |
| 3,379,576 | 4/1968 | Matter | 73/327 X |
| 3,383,917 | 5/1968 | Ryder et al. | 73/327 |
| 3,570,311 | 3/1971 | Nelson | 73/327 |
| 3,615,868 | 10/1971 | Melone | 73/327 X |

Primary Examiner—Jerry W. Myracle
Assistant Examiner—Joseph W. Roskos
Attorney, Agent, or Firm—Robert W. Beart; Glenn W. Bowen

[57] ABSTRACT

An optical liquid indicator having a light transparent rod with a reflective lower surface and a collar or cap with a central aperture which receives the upper end of the rod is disclosed. The collar is preferably formed of a plastic material with a pair of inwardly projecting annular sealing members. One of the sealing members is rigid and the other one is flexible. The upper portion of the indicator rod has a relatively wide surface which diverges outwardly from the rod and a relatively narrow surface which is inclined toward the rod, and there is an outwardly projecting disc at the upper viewing surface. The collar is forced upwardly over the rod so that the rigid sealing member snaps into place against the inwardly inclined surface and the flexible sealing member is bent inwardly against the lower surface of the disc so as to form a seal between the collar and the rod.

10 Claims, 2 Drawing Figures

PATENTED JUL 8 1975
3,893,339
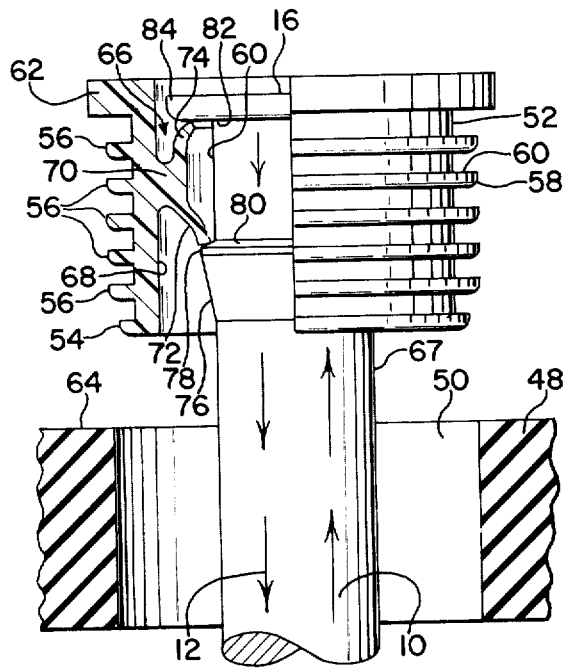
Fig. 2
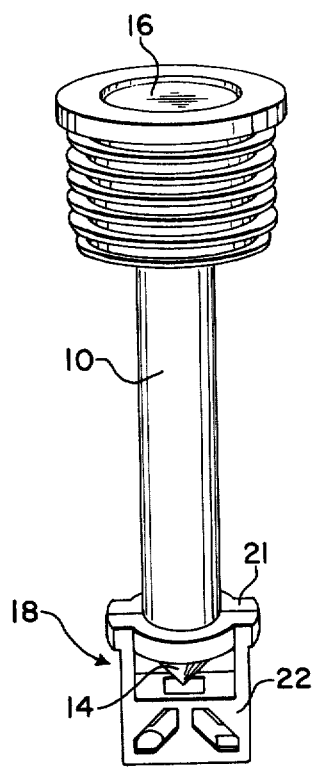
Fig. 1
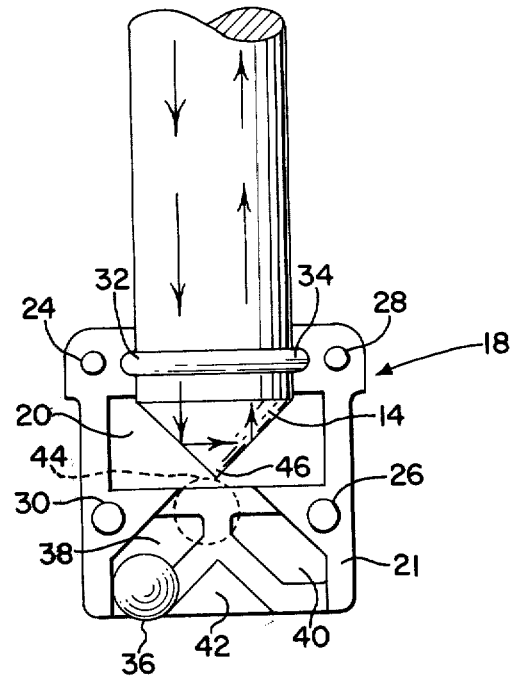

LIQUID LEVEL INDICATOR

BACKGROUND OF THE INVENTION

The present invention relates to liquid level indicating devices which may be combined with hydrometer devices so as to form a combined liquid level indicator and hydrometer. Specifically the present device relates to a transparent rod which may be formed of glass, styrene acrylonitrile, methyl methacrylate and other suitable light transmitting materials. The rod has an upper viewing surface and a lower reflective surface which is immersable into the liquid that is to be monitored. Generally the lower reflective surface takes the form of a cone having a 90° included angle. When the rod is not immersed in a liquid, light travels down the rod and is reflected from one portion of the conical surface horizontally to an oppositely disposed portion of the surface and is then reflected upwardly to the viewing surface. When the lower end of the rod is immersed in the liquid, reflection of light is prevented and a dark pattern appears in the viewing surface of the rod.

The utility of the liquid level indicator described above may be extended by combining a hydrometer with it. The combined level indicator and hydrometer is particularly useful for battery applications, since with a combined liquid level indicator and hydrometer the liquid level and the specific gravity of the electrolyte of a storage battery may be checked without removal of the filling caps from the battery. This type of device is also useful for checking the liquid level and the specific gravity of the radiator cooling fluid of an automobile without removal of the cooling system cap.

A liquid level indicator of the type described may be made into a combined liquid level indicator and hydrometer by the attachment of a gauge containing a small ball at its lower end. The ball is constrained to move adjacent the lower point of the conical surface of the rod when the specific gravity of the liquid is high, thereby providing an indication to the viewing surface of the presence of the ball. When the specific gravity falls, the ball drops below the point of the cone causing a dark viewing pattern to appear on the upper viewing surface of the rod if the liquid level is at the proper height. If the liquid level is low, a bright viewing pattern will appear at the viewing surface due to the reflection of light from the reflective conical lower surface of the rod. Hydrometer means of the general type which may be suitably employed with the liquid level indicator are disclosed in U.S. Pat. No. 3,597,973 to Francis E. Ryder, patented Apr. 10, 1971, and assigned to the assignee of the present invention, Illinois Tool Works Inc.

In many applications of the combined liquid level indicator and hydrometer it is desirable to provide a tight seal between a collar or cap surrounding the upper end of the indicator rod and the rod whereby the collar may be securely inserted into a hollow container leading into the battery. The seal prevents the container from spilling and prevents outside liquids from being admitted into the container. In the past this has generally been accomplished by means of resilient sealing members, such as O rings and the like, which are compressed between the collar and the rod to form a seal therebetween. Since the cost of a liquid level indicator of the described type, including assembly costs, must be kept to a minimum; the sealing means must be both simple and effective. The elimination of parts in such a device is, therefore, a very important consideration in the design of such an indicator.

It is, therefore, the principal object of the present invention to provide a liquid level indicator consisting of an elongated transparent rod having an upper viewing surface, a disc at the viewing surface which extends outwardly beyond the periphery of the rod, an outwardly inclined surface on the rod below the disc, an inwardly inclined surface above the outwardly inclined surface and a collar or cap which surrounds the upper portion of the rod having a rigid sealing member which rides up the outwardly inclined surface and snaps into place against the inwardly inclined surface and a flexible sealing member which is located above the rigid sealing member and is bent inwardly by the lower surface of the disc so as to form a seal between the collar or cap and the rod.

Other objects and advantages of the present invention will be apparent from the following description and the accompanying drawings.

DESCRIPTION OF THE DRAWINGS

The present invention is illustrated in the following drawings wherein:

FIG. 1 is a perspective view of a combined liquid level indicator and hydrometer utilizing the sealing construction of the present invention; and FIG. 2 is a partial cross-sectional view which shows the internal structure of the indicator collar and the external surface of the portion of the rod that is surrounded by the collar, and the hydrometer cage with one of the two sections that make up the cage being removed.

Technical Description of the Invention

Referring to the drawings there is shown an embodiment of the present invention which is particularly adapted for use with storage batteries, particularly those used in trucks. The indicator consists of an elongated transparent rod 10 which may be formed of a transparent plastic material such as styrene acrylonitrile, which receives incident light rays 12 which are transmitted down the rod to a lower reflecting surface 14, which in the present embodiment takes the form of a conical surface having an included angle of 90°. The light rays 12 are reflected from one portion of the surface horizontally across to an opposite portion of the surface and then returned upwardly to the viewing surface 16 at the top of the rod 10, when the rod 10 is not immersed in a liquid. When the rod is immersed in a liquid, reflection is thereby prevented. Thus, if a bright pattern is viewed at the viewing surface 16, it indicates that the level of the container being monitored is low.

The rod indicator 10 may be combined with a hydrometer in a manner shown in the previously mentioned Ryder U.S. Pat. No. 3,597,973. The hydrometer cage 18 is secured to the lower end of the rod 10 so that the reflecting surface 14 projects into the opening 20 in the hydrometer cage 18. The hydrometer cage 18 may be formed in two housing sections 21, 22 which are ultrasonically welded together by means of the male projections 24, 26 on the cage section 22, which extend into corresponding female apertures in the other cage section 22. Correspondingly, the apertures 28, 30 receive male holding pins from the other cage section 22. The hydrometer cage 18 is preferably formed of a plastic material such as styrene acrylonitrile having a filler material which gives it a black color so that it is not transparent. The lower end of the rod 10 is formed with a rib 32 which fits into a corresponding recess 34 in the housing section 21. A small ball of an appropriate specific gravity may be formed of a material such as silicone rubber, which is preferably colored a bright color such as green or orange and is retained by the cage 18. The ball 36 is restrained by the sections 21, 22 to travel along two paths defined generally by the apertures 38, 40 on both sides of the projections 42. When the ball is in the position shown in FIG. 2 the specific gravity will be of a low value. If the liquid level is at the proper height, a dark viewing pattern will be seen at the viewing surface 16. When the ball goes to the dotted position 44 shown below the tip 46 of the conical surface 14, a dark pattern will no longer be seen at the viewing surface 16 since the ball will now be invisible to the viewer. This indicates that the liquid level and the specific gravity are both satisfactory.

The embodiment of the present invention, as shown in FIGS. 1 and 2, is especially adapted for use in truck batteries for measuring the level and specific gravity of the electrolyte of the battery since these batteries have a hollow container 48 that has a large central aperture 50 leading into the battery which is permanently sealed. The level indicator has a collar 52 which is secured in the container 48 by pressing it downwardly. The collar 52 is preferably formed of a somewhat resilient plastic material such as polypropylene. The collar 52 has a lower rib 54 of a relatively short diameter, and a plurality of ribs 56 located above the rib 54 which are of a relatively larger diameter. The ribs 54, 56 have upwardly curved lower surfaces 58 and a flat upper surface 60. The shortened rib 54 and the curved surfaces 58 allow the collar 52 to be depressed into the container 48 so as to be tightly secured thereto, but so as to resist removal from the container once the collar 52 has been forced into place. The upper rim 62 of the collar 52 then fits over the upper surface 64 of the container 48. The present invention may also be employed in applications in which the collar 52 is replaced by a battery indicator cap having a conventional external configuration, if desired.

The collar 52 is secured to the rod 10 and is sealed so as to prevent the loss of liquid from the battery and the admission of external liquids to the battery by means of an integrally formed sealing element 66 which extends inwardly towards the outer periphery 67 of the rod 10 from the inner surface 68 of the collar 52. The sealing element 66 extends in an annular manner around the entire inner surface 68 and is formed with a relatively rigid downwardly projecting sealing member 72 and a relatively flexible upwardly projecting sealing member 74, both of which preferably have an annular shape. The rod 10 has an outwardly inclined relatively wide surface 76 which extends to a short vertical transition surface 78. The transition surface 78 meets with a relatively short inwardly inclined surface 80.

To complete assembly of the indicator structure the collar 52 is inserted over the bottom of the rod 10 before the hydrometer cage 18 is secured to it. The collar 52 is slid upwardly until the rigid sealing member 72 is deflected outwardly by the surface 76 and is then snapped into place against the inwardly inclined surface 80. When the rigid sealing member 72 is pressed against the surface 80, so as to form a seal therebetween, the flexible sealing member 74, because of its length, will be bent inwardly against the lower surface 82 of the disc 84 which extends outwardly from the top of the rod 10 so as to provide an upper seal to prevent the passage of gas or liquid between the collar or cap 52 and the rod 10.

The invention is claimed as follows:

1. A liquid indicator comprising an elongated rod of a light transmitting material having an upper viewing surface and a lower reflective surface, a projecting disc near its upper viewing surface having a diameter greater than the diameter of the rod, an outwardly inclined surface below said disc which extends upwardly, an inwardly inclined surface above said outwardly inclined surface, a closure member which surrounds said rod, an annular sealing element extending inwardly towards said rod from the inner periphery of said closure member comprising a relatively rigid downwardly extending sealing member and a relatively flexible upwardly extending sealing member constructed so that said closure member is held in sealing engagement with said rod when said closure member is forced upwardly from the bottom of the said rod to the point where said rigid sealing member abuts against said inwardly inclined surface in sealing relationship and said flexible sealing member is deflected inwardly by the lower surface of said disc so as to form a seal between said lower surface, said disc, and the outer periphery of said rod.

2. A liquid indicator as set forth in claim 1 wherein said closure member is formed of a plastic material and said sealing element is an integral part of said closure member and said sealing members have an annular shape.

3. A liquid indicator as set forth in claim 2 wherein said closure member is formed of polypropylene.

4. A liquid indicator as claimed in claim 1 wherein said outwardly inclined surface is of a relatively long dimension and said inwardly inclined surface is of a relatively short dimension.

5. A liquid indicator as set forth in claim 4 wherein a relatively short transition surface is disposed between said outwardly inclined surface and said inwardly inclined surface.

6. A liquid indicator as set forth in claim 1 wherein the outer periphery of said closure member has a plurality of ribs each of which have a surface that curves in a first direction and a flat surface that is directed in a second direction whereby said closure means may be easily inserted into a receiving member in one direction but resists removal from said receiving member when force is applied in the opposite direction.

7. A liquid indicator as set forth in claim 2 wherein said outwardly inclined surface is of a relatively long dimension and said inwardly inclined surface is of a relatively short dimension.

8. A liquid indicator as set forth in claim 7 wherein a relatively short transition surface is disposed between said outwardly inclined surface and said inwardly inclined surface.

9. A liquid indicator as set forth in claim 8 wherein the outer periphery of said closure member has a plurality of ribs each of which have a surface that curves in a first direction and a flat surface that is directed in a second direction whereby said closure means may be easily inserted into a receiving member in one direction but resists removal from said receiving member when force is applied in the opposite direction.

10. A liquid indicator as set forth in claim 9 wherein said closure member is formed of polypropylene.

* * * * *